(12) United States Patent
Verloop et al.

(10) Patent No.: US 9,127,329 B2
(45) Date of Patent: Sep. 8, 2015

(54) METHOD FOR HOT FORMING A COATED METAL PART AND FORMED PART

(75) Inventors: Willem Cornelis Verloop, Hoofddorp (NL); Marc Jacco van Genderen, Heerhugowaard (NL); Ronald Theodoor van Tol, 's-Gravenzande (NL); Guido Cornelis Hensen, Haarlem (NL); Jenny Loiseaux, Heemskerk (NL)

(73) Assignee: TATA STEEL IJMUIDEN B.V., Ijmuiden (NL)

( * ) Notice: Subject to any disclaimer, the term of this patent is extended or adjusted under 35 U.S.C. 154(b) by 0 days.

(21) Appl. No.: 13/818,041

(22) PCT Filed: Jul. 19, 2011

(86) PCT No.: PCT/EP2011/003601
§ 371 (c)(1),
(2), (4) Date: Feb. 20, 2013

(87) PCT Pub. No.: WO2012/028224
PCT Pub. Date: Mar. 8, 2012

(65) Prior Publication Data
US 2013/0153094 A1 Jun. 20, 2013

(30) Foreign Application Priority Data
Aug. 31, 2010 (EP) .................................. 10009041

(51) Int. Cl.
*C21D 8/02* (2006.01)
*C21D 9/46* (2006.01)
(Continued)

(52) U.S. Cl.
CPC ............ *C21D 8/0247* (2013.01); *B32B 15/013* (2013.01); *C21D 1/673* (2013.01);
(Continued)

(58) Field of Classification Search
CPC ........................................................ C21D 7/13
USPC ......... 148/526, 527, 529–533, 537, 559, 579, 148/622–624, 639–644, 648–654, 656–658, 148/660–664, 714; 428/577, 657–659, 428/681–685; 72/46, 47, 379.2, 364
See application file for complete search history.

(56) References Cited

U.S. PATENT DOCUMENTS 3,056,694 A * 10/1962 Mehler et al. ................. 148/533
2008/0286603 A1* 11/2008 Oh et al. ....................... 428/684
(Continued)

FOREIGN PATENT DOCUMENTS

DE 102008022400 A1 11/2009
EP 2177641 A1 4/2010
(Continued)

OTHER PUBLICATIONS

"Glossary of Metallurgical and Metalworking Terms," Metals Handbook, ASM International, 2002, term(s): blank, sheet, strip.*
International Search Report dated Oct. 12, 2011 from international Application PCT/EP2011/003601 filed Jul. 19, 2011.

*Primary Examiner* — Roy King
*Assistant Examiner* — Vanessa Luk
(74) *Attorney, Agent, or Firm* — Novak Druce Connolly Bove + Quigg LLP

(57) ABSTRACT

A method for manufacturing a coated part having very high mechanical properties using hot forming techniques. The method includes: —providing an annealed steel strip or blank or pre-shaped part that was coated with a metal or metal alloy before the annealing —if a strip is provided, cutting a blank from the strip before or after the annealing —optionally forming a pre-shaped part from the blank —heating the blank or preshaped part to a temperature of 500° C. at an average heating rate of 16° C./s or more —further heating the blank or pre-shaped part to a temperature between 700 and 1000° C. —hot forming the blank or preshaped part into a hot formed part —hardening the hot formed part. A method for manufacturing a coated steel strip, blank or pre-shaped part, and a coated steel strip, blank or part and a hot formed part.

25 Claims, 1 Drawing Sheet

(51) Int. Cl.
*C23C 2/06* (2006.01)
*C23C 2/40* (2006.01)
*B32B 15/01* (2006.01)
*C21D 1/673* (2006.01)
*C21D 8/04* (2006.01)
*C21D 9/48* (2006.01)
*C22C 38/02* (2006.01)
*C22C 38/04* (2006.01)
*C23C 10/28* (2006.01)
*C23C 10/60* (2006.01)

(52) U.S. Cl.
CPC ........... *C21D 8/0205* (2013.01); *C21D 8/0447* (2013.01); *C21D 9/46* (2013.01); *C21D 9/48* (2013.01); *C22C 38/02* (2013.01); *C22C 38/04* (2013.01); *C23C 10/28* (2013.01); *C23C 10/60* (2013.01)

(56) References Cited

U.S. PATENT DOCUMENTS

| | | | |
|---|---|---|---|
| 2010/0026048 A1* | 2/2010 | Vlot et al. | 296/193.01 |
| 2011/0045316 A1 | 2/2011 | Brandstatter et al. | |
| 2011/0048585 A1* | 3/2011 | Toki et al. | 148/529 |
| 2011/0174418 A1 | 7/2011 | Maki et al. | |
| 2011/0236719 A1 | 9/2011 | Hensen et al. | |
| 2012/0085467 A1 | 4/2012 | Thirion et al. | |

FOREIGN PATENT DOCUMENTS

| | | | |
|---|---|---|---|
| WO | WO2009/021743 A1 * | 2/2009 | C23C 2/26 |
| WO | WO2009/096351 A1 * | 8/2009 | C23C 2/26 |
| WO | 2010/005121 A1 | 1/2010 | |
| WO | 2010/069588 A1 | 6/2010 | |
| WO | 2010/085983 A1 | 8/2010 | |

* cited by examiner

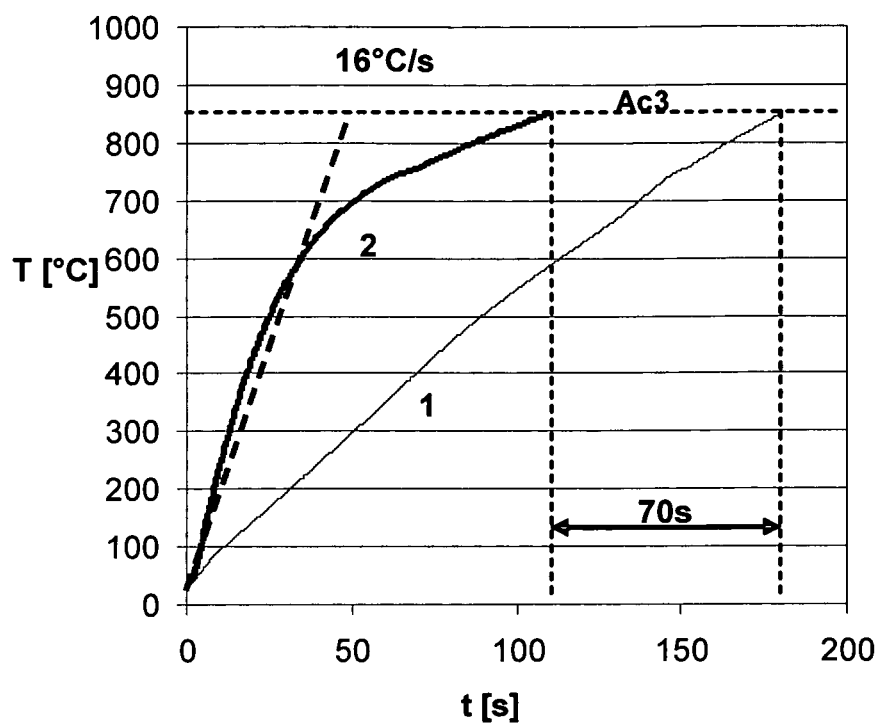

METHOD FOR HOT FORMING A COATED METAL PART AND FORMED PART

CROSS-REFERENCE TO RELATED APPLICATIONS

This is a §371 National Stage Application of International Application No. PCT/EP2011/003601 filed on 19 Jul. 2011, claiming the priority of European Patent Application No. 10009041.4 filed on 31 Aug. 2010.

FIELD OF THE INVENTION

The invention relates to a method for manufacturing a coated part using hot forming techniques. The invention also relates to a method for manufacturing a coated steel strip, blank or pre-formed part for the hot forming method, and to a coated steel strip, blank, part or pre-formed part and a hot formed part.

The use of hot forming techniques for the forming of a part is well known, especially for automotive purposes. Starting from a sheet that can be easily formed, the hot forming techniques provide a formed part having very high mechanical properties, such as a tensile strength above 1200 MPa.

BACKGROUND OF THE INVENTION

Usually the hot forming is performed by providing a blank, heating the blank to a temperature between 700° and 1000° C. and keeping the blank at that temperature for a few minutes, placing the heated blank in a hot forming apparatus, forming the blank into a part in the hot forming apparatus, and hardening the hot formed part.

When using uncoated steel, the heating of the blank before the hot forming in a hot forming apparatus can be performed under a protective atmosphere to prevent oxidation and decarburization of the steel. However, the hot forming itself and the hardening take place in air, and thus oxidation occurs; therefore, after the hot forming the hot formed parts must be descaled. To overcome this drawback, in the last ten years it has been proposed to use coated steel sheets, which sheets are heated to a temperature above the Ac1 temperature. During the heating a diffusion layer is formed between the coating and the steel sheet, providing protection against oxidation and a good adherence of the coating to the steel sheet, also at the elevated temperatures which are used for hot forming.

Though a protective atmosphere is not necessary anymore when using coated steel sheets, the known method has some drawbacks. One of the main problems is that the heating velocity of the coated steel sheets has been found to be critical. This makes the whole process more difficult to control. It also results in the heating of a steel sheet taking a considerable time, for instance 5 minutes, whereas the hot forming in the hot forming apparatus and the subsequent hardening can be performed in less than 1 minute. Manufacturing at a high production rate, as made possible by the hot forming apparatus, can be performed by heating a number of coated steel sheets in an oven. However, when there is a delay at the hot forming apparatus the coated steel sheets remain too long in the oven, which means that they have to be scrapped. This has a considerable influence on the cost of the hot forming process. Moreover, the oven has to be very long.

SUMMARY OF THE INVENTION

It is an object of the invention to provide a method for manufacturing a coated part using hot forming techniques, which makes it possible to control the process in a more flexible and robust manner.

It is also an object of the invention to provide a method for manufacturing a coated part using hot forming techniques, which makes it possible to easily and effectively produce hot formed parts.

It is a further object of the invention to provide a method for manufacturing a coated part using hot forming techniques, which is more cost-effective than the known method.

Furthermore, it is an object of the invention to provide a coated steel strip, a coated steel blank and a coated pre-shaped part, and a method to produce these, which can be used in the method according to the invention.

BRIEF DESCRIPTION OF THE DRAWING

FIG. 1 shows the heating curves for a substrate covered with two different coatings.

DETAILED DESCRIPTION OF THE PREFERRED EMBODIMENTS

According to the invention one or more of these objects is reached by providing a method for manufacturing a coated part having very high mechanical properties using hot forming techniques, comprising the following steps:
1. providing an annealed steel strip or blank or pre-shaped part that has been coated with a metal or metal alloy before the annealing
2. if a strip is provided, cutting a blank from the strip before or after the annealing
3. optionally forming a pre-shaped part from the blank
4. heating the blank or pre-shaped part to a temperature of 500° C. at an average heating rate of 16° C./s or more
5. further heating the blank or pre-shaped part to a temperature between 700 and 1000° C.
6. hot forming the blank or pre-shaped part into a hot formed part
7. hardening the hot formed part.

The inventors have found that due to the use of annealed coated steel, the heating of the annealed steel strip or blank or pre-shaped part can be performed at an average heating rate of 16° C./s or more up to a temperature of 500° C. In this way, the heating of the blank or pre-shaped part before the hot forming thereof can be performed much faster than usual. The heating of the blank or pre-shaped part can now be performed within 3 minutes before the blank or pre-shaped part is taken out of the oven and put in the hot forming apparatus. This fast heating according to the invention is possible using a blank, which is used in the direct hot forming process, or using a pre-shaped part, which is used in the indirect hot forming process.

According to a preferred embodiment, the blank or pre-shaped part in step 4 is heated to a temperature of 625° C. at an average heating rate of 16° C./s or more, and further heated in step 5 to a temperature between 700 and 1000° C. before the blank or pre-shaped part is hot formed. By heating the blank or pre-shaped part to a temperature of 700° C. at the high heating rate of 16° C./s or more, the heating of the blank or pre-shaped part can be performed in an even shorter time period.

According to a further preferred embodiment, the blank or pre-shaped part in step 4 is heated to a temperature of 700° C. at an average heating rate of 16° C./s or more, and optionally further heated in step 5 to a temperature between 700 and 1000° C. before the blank or pre-shaped part is hot formed. By heating the blank or pre-shaped part to a temperature of 700° C. at the high heating rate of 16° C./s or more, the heating of the blank or pre-shaped part can be performed in an even shorter time period of less then 2 minutes.

According to a further preferred embodiment, the blank or pre-shaped part in step 4 is heated to a temperature between 700 and 900° C. at an average heating rate of 16° C./s or more, and optionally further heated in step 5 to a temperature of at most 1000° C. before the blank or pre-shaped part is hot formed. By heating the blank or pre-shaped part to a temperature between 700 and 900° C. at the high heating rate of 16° C./s or more, the heating of the blank or pre-shaped part can be performed in a very short time period of less then 90 seconds when the average heating rate of 16° C./s or more is used to temperatures above the Ac1 temperature.

Preferably the metal or metal alloy is zinc or a zinc alloy. The inventors have found that the use of an annealed zinc or zinc alloy coating makes it possible to use very high heating rates.

According to a preferred embodiment the coating on the blank or pre-shaped part remains solid during step 4 and step 5. This has of course the advantage that the coating remains on the blank or pre-shaped part, and especially for pre-shaped parts remains evenly spread on non-horizontal portions of the pre-shaped part and does not flow. Because the coating remains solid it does not stick to handling equipment. Moreover, no energy is needed to transform the coating from the solid into the liquid state.

Preferably, the heating rate is 20° C./s or more, and more preferably 25° C./s or more. These high heating rates make it possible to heat the coated blank or pre-shaped part before the hot forming of the part in a time period shorter than one minute.

Preferably, in step 4 the blank or pre-shaped part is heated at an average heating rate of at most 50° C./s. Higher heating rates make it difficult to control the highest temperature to which the blank or pre-shaped part are heated.

According to a preferred embodiment, the steel has the following composition in weight percent:
$0.1<C<0.5$
$0.5<Mn<3.0$
$0.1<Si<0.5$
$Cr<1.0$
$Ti<0.2$
$Al<0.1$
$P<0.1$
$S<0.05$
$0.0005<B<0.08$
optionally:
$Nb<0.1$
$V<0.1$
unavoidable impurities
the remainder being iron.
Though other metal composition are also possible, it has been found that the steel composition as given above will give very good results in most cases.

According to a preferred embodiment the metal alloy is a zinc alloy having the following composition in weight percent:
$1.0<Al<5.0$, preferably $1.5<Al<2.0$
$1.0<Mg<5.0$, preferably $1.5<Mg<2.0$
at most 0.2 in total of one or more standard alloying elements remainder zinc and inevitable impurities.
The inventors have found that using a zinc alloy having this composition, the blank or pre-shaped part can be heated at very high heating rates above 16° C./s. The standard alloying elements are Pb, Sb, Ti, Ca, Mn, La, Ce, Cr, Ni, Zr, and Bi.

According to a second aspect of the invention there is provided a method for manufacturing the annealed steel strip or blank or pre-shaped part that has been coated with a metal or metal alloy before the annealing as provided in the first aspect of the invention, comprising the following steps:
  1—providing a steel strip or blank or pre-shaped part
  2—coating the steel with a layer of metal or metal alloy, preferably zinc or zinc alloy
  3—heating the coated steel to a temperature between 700° C. and 1000° C. and keeping the strip or blank or pre-shaped part at that temperature during a time period of at most 30 minutes
  4—cooling the coated steel.
This method for manufacturing a coated and annealed steel strip or blank or pre-shaped part is thus performed independently from the hot forming process as such. The choice for a high diffusion temperature between 700° C. and 1000° C. means that a relatively short production time for the forming of the diffusion layer can be obtained.

Preferably in the method according to the second aspect of the invention, if a strip is provided the steel strip is cut to form a blank from the strip, and a pre-shaped part is formed from the blank after step 1, 2, 3 or 4. Since blanks or pre-shaped parts are used in the hot forming process, it is preferred to store and transport blanks or pre-shaped parts which can be directly used in the hot forming process.

According to a third aspect of the invention the coated steel strip, blank, part or pre-shaped part as produced according to the method of the second aspect of the invention is provided with a coating of zinc or zinc alloy, wherein the outer layer of the coating on average contains more than 5 weight % Fe over a depth of 3 μm. A coated steel having more than 5 weight % Fe over a depth of 3 μm can be used in the hot forming of the blank or pre-shaped part.

Preferably the outer layer of the coating on average contains more than 10 weight % Fe over a depth of 3 μm, more preferably more than 20 weight % Fe, still more preferably more than 30 weight % Fe, and most preferably more than 40 weight % Fe. A higher amount of Fe in the outer layer of the coating means that the coating and the Fe from the steel have better diffused.

According to a fourth aspect of the invention a hot formed coated part is provided that is manufactured using the method according to the first aspect of the invention.

The invention will be elucidated referring to the experiments hereinafter.

FIG. 1 shows the heating curves for a substrate covered with two different coatings.

The substrate is a 1.5 mm thick 22MnB5 boron steel.

Example 1 is a blank which is covered by a zinc alloy containing 1.6 weight % Al to and 1.6 weight % Mg, the remainder being zinc. The coating has a coating weight of 140 g/m² (70 g/m² per side).

Example 2 is a blank which is covered by the same coating as in example 1, but the blank has been annealed at 750° C. Due to the annealing, the average Fe content of the coating is more than 20%.

The two blanks have been put in an oven together. The oven temperature had been set on 920° C. The blanks have been heated to a temperature of approximately 850° C.; the temperature of the blanks has been measured using a thermocouple.

FIG. 1 shows the heating curves of the blanks. The horizontal axis shows the dwell time t of the blanks in the oven in seconds; the vertical axis shows the temperature T of the blanks in ° C.

Inspection of the blanks showed that the coating of example 1 became liquid.

The coating of example 2 remained solid through the full heating up to 850° C.

FIG. 1 shows that the blank of example 2 is heated with a heating rate of more than 16° C./s up to a temperature of 500° C., and that the average heating rate is 16° C. up to a temperature of approximately 650° C. Contrary to this the heating rate of the blank of example 1 is far below 16° C./s.

The time to reach the Ac3 temperature, at which the steel will fully transform into austenite and which is approximately 850° C./s for the present substrate, is approximately 110 seconds for example 2 and approximately 180 seconds for example 1.

After the blanks have reached the Ac3 temperature they can be given some additional time to homogenise into austenite before they can be put in a hot forming apparatus.

The invention claimed is:

1. A method for manufacturing a coated part having tensile strength above 1200 MPa using hot forming techniques, comprising the following steps:
   1. providing an annealed workpiece selected from the group consisting of a strip or a blank, said workpiece having a thickness of 1.5 mm, said workpiece comprising a steel substrate coated with zinc or a zinc alloy before the annealing, wherein providing the annealed workpiece comprises the following steps:
      A. providing the steel strip or blank substrate,
      B. coating the steel substrate with a layer of zinc or zinc alloy,
      C. heating the coated steel to anneal the coated steel, and
      D. cooling the annealed coated steel to result in the annealed workpiece, wherein the outer layer of the coating of the annealed workpiece on average contains more than 20 weight % Fe over a depth of 3 μm,
   2. if a strip substrate is provided, cutting a blank from the strip before or after the annealing,
   3. optionally forming a pre-shaped part from the blank,
   4. initial heating comprising heating the blank or pre-shaped part at an average heating rate of 16° C./s or more from ambient temperature to a step 4 temperature selected from the group consisting of 500° C., 625° C., and 700° C.,
   5. further heating the blank or pre-shaped part from the step 4 temperature to a temperature above an Ac1 temperature of the steel substrate which is between 700 and 1000° C. in an oven,
   6. hot forming the blank or pre-shaped part from the step 5 into a hot formed part in a hot-forming apparatus,
   7. hardening the hot formed part,
   wherein the total time of steps 4 and 5 is 3 minutes or less, wherein the zinc alloy consists of the following composition in weight percent:
      $1.0<Al<5.0$,
      $1.0<Mg<5.0$,
      at most 0.2 in total of one or more standard alloying elements Pb, Sb, Ti, Ca, Mn, La, Ce, Cr, Ni, Zr, and Bi
      remainder zinc and inevitable impurities.

2. The method for manufacturing a coated part according to claim 1, wherein the step 4 temperature is 625° C.

3. The method according to claim 2, wherein the zinc alloy consists of the following composition in weight percent:
   $1.5<Al<2.0$
   $1.5<Mg<2.0$
   at most 0.2 in total of one or more standard alloying elements Pb, Sb, Ti, Ca, Mn, La, Ce, Cr, Ni, Zr, and Bi
   remainder zinc and inevitable impurities.

4. The method for manufacturing a coated part according to claim 2, wherein said average heating rate to a temperature of 625° C. is 16° C./s to 25° C./s.

5. The method for manufacturing a coated part according to claim 1, wherein the step 4 temperature is 700° C.

6. The method according to claim 5, wherein the zinc alloy consists of the following composition in weight percent:
   $1.5<Al<2.0$
   $1.5<Mg<2.0$
   at most 0.2 in total of one or more standard alloying elements Pb, Sb, Ti, Ca, Mn, La, Ce, Cr, Ni, Zr, and Bi
   remainder zinc and inevitable impurities.

7. The method for manufacturing a coated part according to claim 5, wherein said average heating rate to a temperature of 700° C. is 16° C./s to 25° C./s.

8. The method for manufacturing a coated part according to claim 5, wherein the combined heating of step 4 and step 5 consists of heating the blank or pre-shaped part to a temperature between 700 and 900° C. at an average heating rate of 16° C./s to 25° C./s.

9. The method for manufacturing a coated part according to claim 8, wherein total time of steps 4 and 5 is 1.5 to 3 minutes.

10. The method for manufacturing a coated part according to claim 5,
    wherein step C comprises heating the coated steel to a temperature between 700° C. and 1000° C. and keeping the strip or blank at that temperature during a time period of at most 30 minutes to anneal the coated steel,
    wherein step 4 comprises heating the blank or pre-shaped part to the step 4 temperature of 700° C. at an average heating rate of 25° C./s or more and step 5 further heats the blank or pre-shaped part from the step 4 temperature to a temperature between 700 and 1000° C., wherein total time of steps 4 and 5 is 1 to 3 minutes.

11. The method for manufacturing a coated part according to claim 1,
    wherein the step 4 temperature is 500° C.,
    wherein step C comprises heating the coated steel to a temperature between 700° C. and 1000° C. and keeping the strip or blank at that temperature during a time period of at most 30 minutes to anneal the coated steel,
    wherein the combined heating of step 4 and step 5 heats the blank or pre-shaped part to a temperature between 700 and 900° C. at an average heating rate of 16° C./s or more and optionally step 5 further heats the blank or pre-shaped part to a temperature between the temperature and said 1000° C.

12. The method according to claim 1, wherein the coating on the blank or pre-shaped part remains solid during step 4 and step 5.

13. The method according to claim 1, wherein in step 4 the blank or pre-shaped part is heated at an average heating rate of 16° C./s to 50° C./s.

14. The method according to claim 1, wherein the steel substrate has the following composition in weight percent:
    $0.1<C<0.5$
    $0.5<Mn<3.0$
    $0.1<Si<0.5$
    $Cr<1.0$
    $Ti<0.2$
    $Al<0.1$
    $P<0.1$
    $S<0.05$
    $0.0005<B<0.08$ optionally:
Nb<0.1
V<0.1
unavoidable impurities
the remainder being iron.

15. The method according to claim 1, wherein the zinc alloy consists of the following composition in weight percent:
1.5<Al<2.0
1.5<Mg<2.0
at most 0.2 in total of one or more standard alloying elements Pb, Sb, Ti, Ca, Mn, La, Ce, Cr, Ni, Zr, and Bi
remainder zinc and inevitable impurities.

16. The method for manufacturing a coated part according to claim 1, wherein said average heating rate to a temperature of 500° C. is 16° C./s to 25° C./s.

17. The method according to claim 1, wherein the blank or pre-shaped part is heated in the oven to above the Ac1 temperature of the steel substrate at a heating rate of 16° C./s or more.

18. The method according to claim 1, wherein the blank or pre-shaped part is heated in the oven to an Ac3 temperature of the steel substrate and given additional time to homogenize into austenite before being put into the hot forming apparatus.

19. A method for manufacturing a coated part having tensile strength above 1200 MPa using hot forming techniques, comprising the following steps:
1. providing an annealed workpiece selected from the group consisting of a strip or a blank, said workpiece having a thickness of 1.5 mm, said workpiece comprising a steel substrate coated with zinc or a zinc alloy before the annealing, wherein providing the annealed workpiece comprises the following steps:
    A. providing the steel strip or blank substrate,
    B. coating the steel substrate with a layer of zinc or zinc alloy,
    C. heating the coated steel to anneal the coated steel, and
    D. cooling the annealed coated steel to result in the annealed workpiece, wherein the outer layer of the coating of the annealed workpiece on average contains more than 20 weight % Fe over a depth of 3 μm,
2. if a strip substrate is provided, cutting a blank from the strip before or after the annealing,
3. optionally forming a pre-shaped part from the blank,
4. initial heating comprising heating the blank or pre-shaped part at an average heating rate of 16° C./s to 25° C./s from ambient temperature to a step 4 temperature selected from the group consisting of 500° C., 625° C., and 700° C.,
5. further heating the blank or pre-shaped part from the step 4 temperature to a temperature above an Ac1 temperature of the steel substrate which is between 700 and 1000° C. in an oven,
6. hot forming the blank or pre-shaped part from the step 5 into a hot formed part in a hot-forming apparatus,
7. hardening the hot formed part,
wherein the total time of steps 4 and 5 is 3 minutes or less.

20. The method for manufacturing a coated part according to claim 19,
wherein step C comprises heating the coated steel to a temperature between 700° C. and 1000° C. and keeping the strip or blank at that temperature during a time period of at most 30 minutes to anneal the coated steel,
wherein the step 4 temperature is 700° C.

21. The method according to claim 20, wherein the zinc alloy consists of the following composition in weight percent:
1.0<Al<5.0,
1.0<Mg<5.0,
at most 0.2 in total of one or more standard alloying elements Pb, Sb, Ti, Ca, Mn, La, Ce, Cr, Ni, Zr, and Bi
remainder zinc and inevitable impurities.

22. The method for manufacturing a coated part according to claim 19, wherein the step 4 temperature is 700° C., wherein the combined heating of step 4 and step 5 consists of heating the blank or pre-shaped part to a temperature between 700 and 900° C. at an average heating rate of 16° C./s to 25° C./s, wherein total time of steps 4 and 5 is 1.5 to 3 minutes.

23. A method for manufacturing a coated part having tensile strength above 1200 MPa using hot forming techniques, comprising the following steps:
1. providing an annealed workpiece selected from the group consisting of a strip or a blank, said workpiece having a thickness of 1.5 mm, said workpiece comprising a steel substrate coated with zinc or a zinc alloy before the annealing, wherein providing the annealed workpiece comprises the following steps:
    A. providing the steel strip or blank substrate,
    B. coating the steel substrate with a layer of zinc or zinc alloy,
    C. heating the coated steel to anneal the coated steel, and
    D. cooling the annealed coated steel to result in the annealed workpiece, wherein the outer layer of the coating of the annealed workpiece on average contains more than 20 weight % Fe over a depth of 3 μm,
2. if a strip is provided, cutting a blank from the strip before or after the annealing,
3. optionally forming a pre-shaped part from the blank,
4. initial heating comprising heating the blank or pre-shaped part at an average heating rate of 16° C./s or more from ambient temperature to a step 4 temperature selected from the group consisting of 500° C., 625° C., and 700° C.,
5. further heating the blank or pre-shaped part from the step 4 temperature to a temperature above an Ac1 temperature of the steel substrate which is between 700 and 1000° C. in an oven,
6. hot forming the blank or pre-shaped part from the step 5 into a hot formed part in a hot-forming apparatus,
7. hardening the hot formed part,
wherein the total time of steps 4 and 5 is 3 minutes or less,
wherein the zinc alloy consists of the following composition in weight percent:
0 to 1.6% Al,
0 to 1.6% Mg,
at most 0.2 in total of one or more standard alloying elements Pb, Sb, Ti, Ca, Mn, La, Ce, Cr, Ni, Zr, and Bi
remainder zinc and inevitable impurities.

24. The method according to claim 23, wherein the coating remains solid during step 4 and step 5.

25. The method for manufacturing a coated part according to claim 23, wherein the step 4 temperature is 700° C., wherein the combined heating of step 4 and step 5 consists of heating the blank or pre-shaped part to a temperature between 700 and 900° C. at an average heating rate of 16° C./s to 25° C./s, wherein total time of steps 4 and 5 is 1.5 to 3 minutes.

* * * * *